(12) United States Patent
Sugiyama et al.

(10) Patent No.: US 9,113,156 B2
(45) Date of Patent: Aug. 18, 2015

(54) DISPLAY DEVICE AND METHOD FOR CONTROLLING THE SAME

(71) Applicant: PANASONIC CORPORATION, Osaka (JP)

(72) Inventors: Keiji Sugiyama, Kyoto (JP); Shinichi Shikii, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 363 days.

(21) Appl. No.: 13/645,602

(22) Filed: Oct. 5, 2012

(65) Prior Publication Data

US 2013/0093762 A1      Apr. 18, 2013

(30) Foreign Application Priority Data

Oct. 17, 2011  (JP) .................................. 2011-227527

(51) Int. Cl.
*G06T 15/00* (2011.01)
*H04N 13/04* (2006.01)
(Continued)

(52) U.S. Cl.
CPC ........ *H04N 13/0402* (2013.01); *G02B 27/2264* (2013.01); *H04N 13/047* (2013.01); *H04N 13/0445* (2013.01); *H04N 13/0447* (2013.01); *H04N 13/0454* (2013.01); *H04N 13/0484* (2013.01); *H04N 13/0497* (2013.01);
(Continued)

(58) Field of Classification Search
CPC ........... G02B 27/2264; H04N 13/0239; H04N 13/0402; H04N 13/0404; H04N 13/0409; H04N 13/0445; H04N 13/0447; H04N 13/0454; H04N 13/047; H04N 13/0484; H04N 13/0497; H04N 13/0429; H04N 13/0434; H04N 13/0232; H04N 13/0431
USPC ............................................................ 348/54
See application file for complete search history.

(56) References Cited

U.S. PATENT DOCUMENTS 5,801,761 A * 9/1998 Tibor .............................. 348/51
6,023,277 A * 2/2000 Osaka et al. .................. 345/419
(Continued)

FOREIGN PATENT DOCUMENTS

EP         2482117 A1 *  8/2012   ............. G02B 27/22
JP         07-098439       4/1995
(Continued)

OTHER PUBLICATIONS

JP07098439A—Abstract, Nakazawa et al,Three-dimensional stereoscopic display device, Sep. 29, 1993.*

*Primary Examiner* — Shan Elahi
(74) *Attorney, Agent, or Firm* — Wenderoth, Lind & Ponack L.L.P.

(57) ABSTRACT

A display device includes: a light source which emits light; a light deflector having a deflection region in which the light from the light source is deflected toward a predetermined position; a liquid crystal panel on which the image is formed by the light from the light deflector; and a control unit which determines a total number of right and left eyes of one or more users and controls operation of the light deflector based on the determined total number of right and left eyes, wherein the control unit segments the deflection region into a plurality of deflection subregions based on the determined total number of right and left eyes and controls light deflection in the deflection subregions to deflect the light from the light source toward different positions at the same time.

7 Claims, 17 Drawing Sheets

(51) Int. Cl.
*G02B 27/22* (2006.01)
*H04N 13/02* (2006.01)

(52) U.S. Cl.
CPC ........ *H04N13/0239* (2013.01); *H04N 13/0404* (2013.01); *H04N 13/0409* (2013.01)

(56) References Cited

U.S. PATENT DOCUMENTS

| | | | |
|---|---|---|---|
| 6,124,920 A * | 9/2000 | Moseley et al. | 349/201 |
| 6,980,176 B2 * | 12/2005 | Matsumoto et al. | 345/6 |
| 7,580,178 B2 * | 8/2009 | Cho et al. | 359/291 |
| 2002/0060659 A1 * | 5/2002 | Matsuda et al. | 345/94 |
| 2003/0086136 A1 * | 5/2003 | Orr et al. | 359/23 |
| 2005/0099689 A1 * | 5/2005 | Fukushima et al. | 359/466 |
| 2005/0146787 A1 * | 7/2005 | Lukyanitsa | 359/462 |
| 2005/0219357 A1 * | 10/2005 | Sun et al. | 348/57 |
| 2006/0158729 A1 * | 7/2006 | Vissenberg et al. | 359/462 |
| 2006/0209066 A1 * | 9/2006 | Kubara et al. | 345/424 |
| 2008/0204873 A1 * | 8/2008 | Daniell | 359/463 |
| 2008/0246837 A1 * | 10/2008 | Schultz et al. | 348/51 |
| 2008/0278809 A1 * | 11/2008 | Redert et al. | 359/478 |
| 2009/0009426 A1 * | 1/2009 | Lee et al. | 345/6 |
| 2009/0167845 A1 * | 7/2009 | Khan | 348/51 |
| 2010/0214634 A1 * | 8/2010 | Kroll et al. | 359/9 |
| 2011/0211256 A1 * | 9/2011 | Connor | 359/463 |
| 2012/0105929 A1 * | 5/2012 | Sung et al. | 359/9 |
| 2012/0127383 A1 * | 5/2012 | Lee et al. | 349/15 |
| 2013/0050807 A1 * | 2/2013 | Lee et al. | 359/316 |

FOREIGN PATENT DOCUMENTS

| | | | |
|---|---|---|---|
| JP | 07098439 A * | 4/1995 | G01J 1/42 |
| JP | 2010-524047 | 7/2010 | |
| WO | 2008/124709 | 10/2008 | |

* cited by examiner

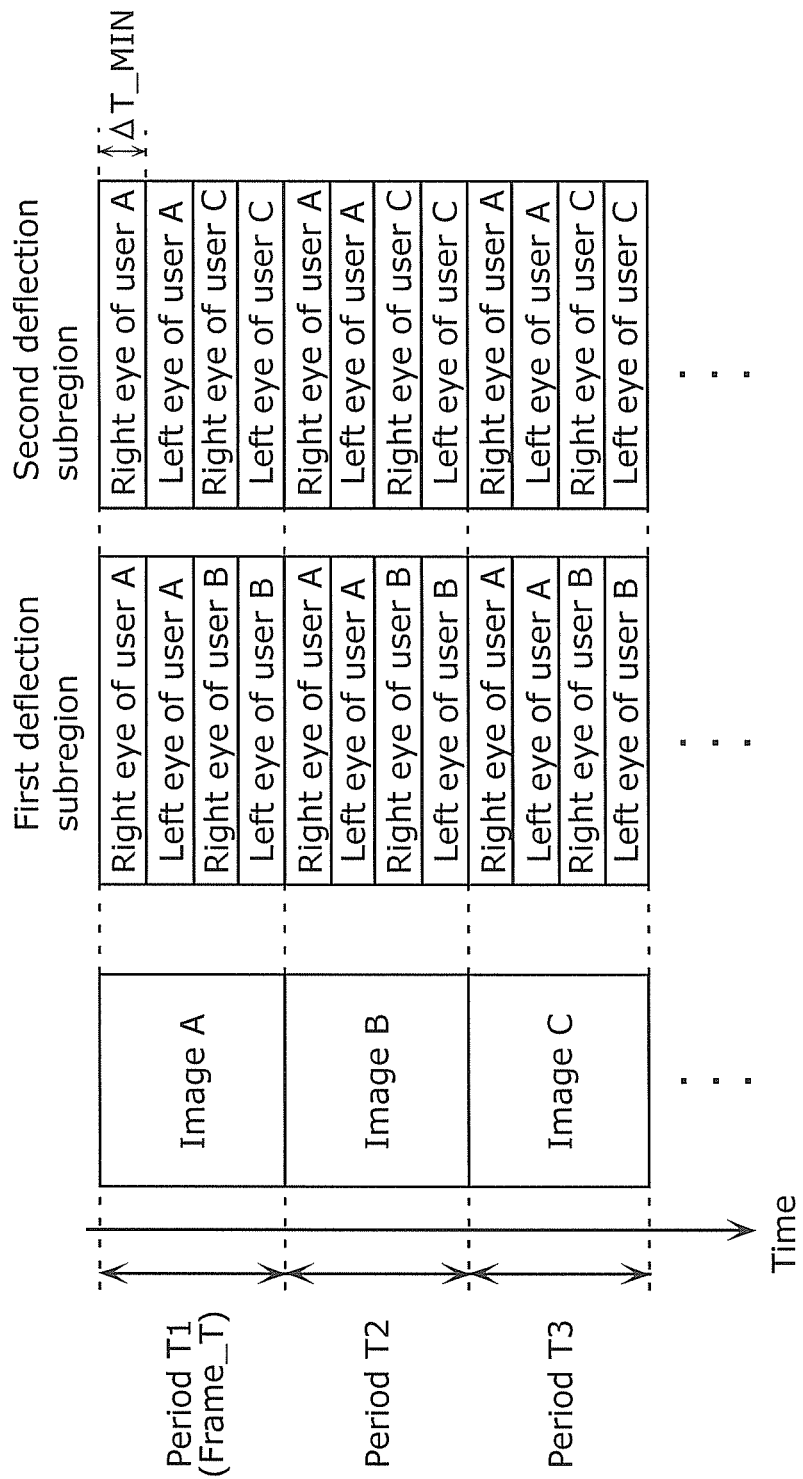

ved a 3D image on the liquid crystal panel, and the light deflector may be used to display a 3D image.
DISPLAY DEVICE AND METHOD FOR CONTROLLING THE SAME

CROSS REFERENCE TO RELATED APPLICATION

The present application is based on and claims priority of Japanese Patent Application No. 2011-227527 filed on Oct. 17, 2011. The entire disclosure of the above-identified application, including the specification, drawings and claims is incorporated herein by reference in its entirety.

FIELD

One or more exemplary embodiments disclosed herein relate to a display device including a light deflector and a method for controlling the display device. The light deflector is capable of adjustably deflecting light.

BACKGROUND

Examples of display devices which display images include a liquid crystal display device. A liquid crystal display device includes a liquid crystal panel and a light source (backlight). The liquid crystal panel functions as a spatial modulation element. The light source has a planar shape and emits light toward the back side of the liquid crystal panel. Light passing through the liquid crystal panel is spatially modulated so that an image is formed on the liquid crystal panel.

With the aim of achieving images with enhanced presence using such a liquid crystal display device, three dimensional (3D) displays capable of representing 3D images are being developed. A 3D display shows a different image to each of the right and left eyes of a user to cause parallax therebetween so that the user can see a 3D image.

For example, a 3D display system including glasses has been proposed which allows a user wearing glasses having a special optical effect to see 3D images. However, the 3D display system including glasses requires a user to take the trouble to wear the glasses each time the user wants to see a 3D image, which results in poor usability. Thus, in recent years, a glasses-free 3D display has been proposed which allows a user to see 3D images without such glasses.

For example, Patent Literature 1 discloses a glasses-free 3D display including a light guide plate having a special shape and a right light source and a left light source disposed at right and left sides of the light guide plate, respectively. The right and left light source are alternately turned on. When the right light source is on, the light from the right light source enters the light guide plate through the right side, and the light outgoing from the light guide plate converges at the right eye of a user. When the left light source is on, the light from the left light source enters the light guide plate through the left side, and the light outgoing from the light guide plate converges at the left eye of the user. The liquid crystal panel display a right-eye image while the right light source is on and a left-eye image while the left light source is on, so that the user can view a 3D image without using special glasses.

However, the user of the 3D display disclosed in Patent Literature 1 needs to fix the positions of the eyes at predetermined positions to see a 3D image. When the eyes of the user are not at the predetermined positions, the light from the light guide plate cannot converge at the eyes of the user, and therefore the user cannot see a 3D image.

Patent Literature 2 discloses a glasses-less 3D display which is proposed to solve the problem. The 3D display includes a light deflector capable of adjustably deflecting light. The light deflector deflects light by taking advantage of modulation of the refractive index of liquid crystal upon application of voltage, for example. The light deflector deflects incident light in a certain time so that outgoing light converges at the right eye of a user. A liquid crystal panel displays a right-eye image synchronously with the time. In a subsequent time, the light deflector deflects incident light so that outgoing light converges at the left eye of the user. The liquid crystal panel displays a left-eye image synchronously with the subsequent time. The liquid crystal panel alternately displays right-eye images and left-eye images with a predetermined period so that the user can see the images displayed on the liquid crystal panel as 3D images.

CITATION LIST

Patent Literature

[Patent Literature 1] Japanese Unexamined Patent Application Publication (Transition of PCT Application) No. 2010-524047

[Patent Literature 2] Japanese Unexamined Patent Application Publication No. 7-98439

SUMMARY

When a plurality of users is viewing images on the liquid crystal panel of the 3D display disclosed in Patent Literature 2, the light deflector may fail to change directions of light deflection at a rate high enough for the frame rate of the liquid crystal panel. This causes a problem of low image quality on the liquid crystal panel.

One non-limiting and exemplary embodiment provides a display device capable of displaying images with less deterioration in image quality even while multiple users are viewing the images, and a method for controlling the display device.

In one general aspect, the techniques disclosed here feature a display device which displays an image and includes: a light source which emits light; a light deflector having a deflection region in which the light from the light source is deflected toward a predetermined position; a display panel on which the image is formed by the light from the light deflector; and a control unit configured to determine a total number of right and left eyes of one or more users viewing the image displayed on the display panel, and control operation of the light deflector based on the determined total number of right and left eyes so that the light deflected by the light deflector is directed alternately toward a right eye and a left eye of each of the one or more users, wherein the control unit is configured to segment the deflection region into a plurality of deflection subregions based on the determined total number of right and left eyes, and control light deflection in the deflection subregions so that the light from the light source is deflected toward different positions at the same time.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

The display device according to one or more exemplary embodiments or features disclosed herein is capable of displaying images with less deterioration in image quality even while multiple users are viewing the images.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 illustrates a relationship between frames displayed on a liquid crystal panel and positions to which light deflected by the light deflector is directed when three users are viewing images displayed on the liquid crystal panel.

DETAILED DESCRIPTION

Underlying Knowledge Forming Basis of the Present Disclosure

In relation to the liquid crystal display device disclosed in the Background section, the inventors have found the following problem.

Figure 17:
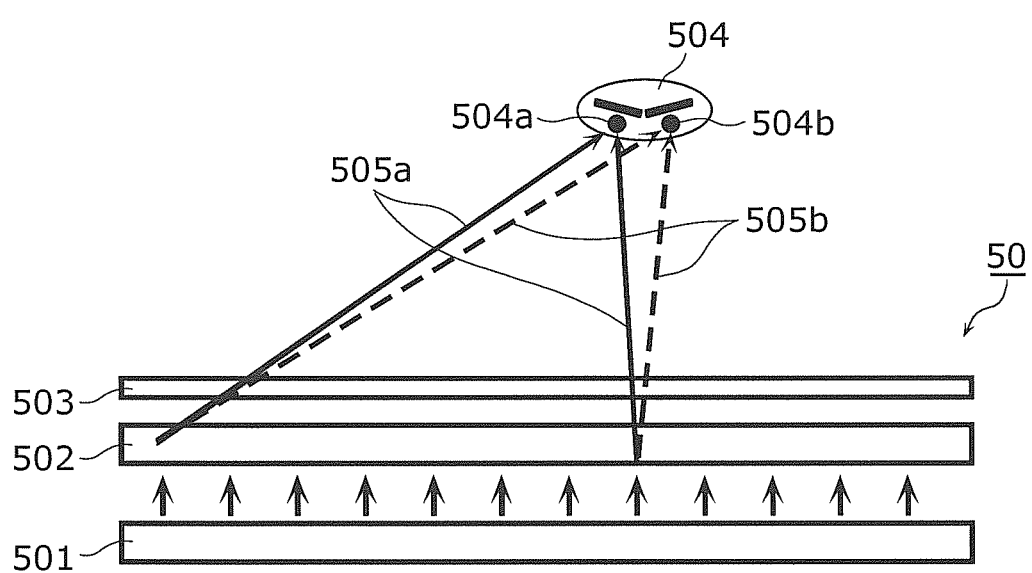
FIG. 17 illustrates a conventional liquid crystal display device.

FIG. 17 illustrates a conventional liquid crystal display device 50. The liquid crystal display device 50 includes a light source 501, a light deflector 502, and a liquid crystal panel 503. Examples of the light deflector 502 include an optical modulator element which deflects light by taking advantage of modulation of the refractive index of liquid crystal upon application of voltage and an element including a micro electro mechanical systems (MEMS) mirror.

Light from the light source 501 is deflected by the light deflector 502 for a period of predetermined duration toward the right eye 504a of a user 504 as indicated by arrows with solid line 505a in FIG. 17. The liquid crystal panel 503 displays a right-eye image during the period of predetermined duration. In a subsequent period of predetermined duration, the light from the light source 501 is then deflected by the light deflector 502 toward the left eye 504b of the user 504 as indicated by arrows with dashed line 505b in FIG. 17. The liquid crystal panel 503 displays a left-eye image during the subsequent period. In this manner, light from the light deflector 502 converges at the right eye 504a and left eye 504b of the user 504 alternately through time, and thereby allowing the user 504 to see the images displayed on the liquid crystal panel 503 as a 3D image.

When a right-eye image and a left-eye image displayed on the liquid crystal panel 503 are identical, the user 504 sees the images on the liquid crystal panel 503 as a two-dimensional (2D) image, and users other than the user 504 cannot see the images on the liquid crystal panel 503. In this case, the liquid crystal display device 50 functions as a privacy display which prevents onlookers from seeing images thereon. A case where the liquid crystal display device 50 functions as a privacy display shall be described below.

Figure 18:
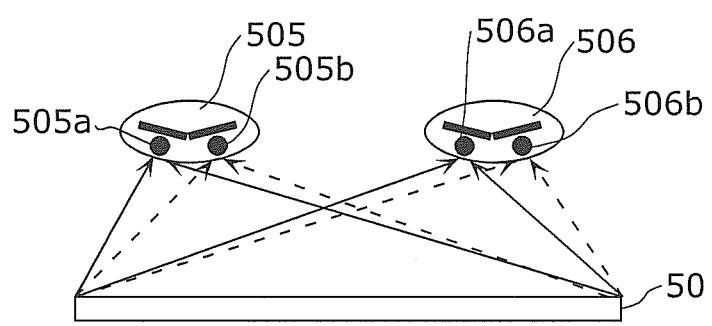
FIG. 18 illustrates control of light deflection performed by a light deflector in the case where two users are viewing images on a liquid crystal panel.

FIG. 18 illustrates control of light deflection performed by the light deflector 502 in the case where two users of a user 505 and a user 506 are viewing images on the liquid crystal panel 503. When the two users 505 and 506 are viewing images on the liquid crystal panel 503, light from the light source 501 is deflected by the light deflector 502 as shown in FIG. 18, sequentially to a right eye 505a of the user 505, a left eye 505b of the user 505, a right eye 506a of the user 506, and a left eye 506b of the user 506 in this cyclic order.

Figure 19:
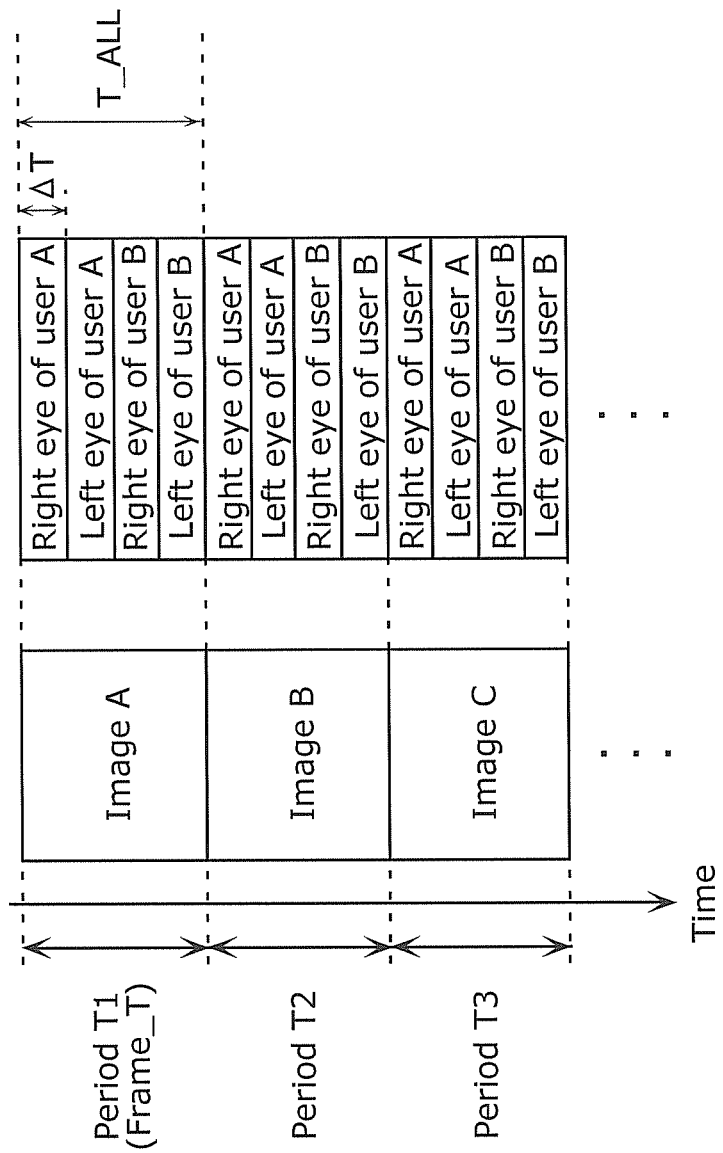
FIG. 19 illustrates a relationship between frames displayed on the liquid crystal panel and positions to which light deflected by the light deflector is directed when two users are viewing images on the liquid crystal panel.

FIG. 19 illustrates a relationship between frames displayed on the liquid crystal panel 503 and positions to which light deflected by the light deflector 502 is directed when two users A and B are viewing images on the liquid crystal panel 503. When the two users A and B are viewing images displayed on the liquid crystal panel 503, the positions to which light deflected by the light deflector 502 is directed are switched sequentially from the right eye of the user A, the left eye of the user A, the right eye of the user B, and then to the left eye of the user B as shown in FIG. 19. On the other hand, the frames displayed on the liquid crystal panel 503 are switched sequentially from the frame of the image A, the frame of the image B, and then to the frame of the image C as shown in FIG. 19.

In a period T1, in which the image A is displayed, light deflected by the light deflector 502 is directed toward the right and left eyes of the user A and the user B. Both the user A and the user B are thereby allowed to see the image A in the period T1. In a period T2 and a period T3, in which the image B and the image C are displayed, respectively, the light deflected by the light deflector 502 is directed toward the right and left eyes of the user A and the user B in each of the periods. Both the user A and the user B are thereby allowed to see the image B in the period T1 and the image C in the period T3.

Figure 20:
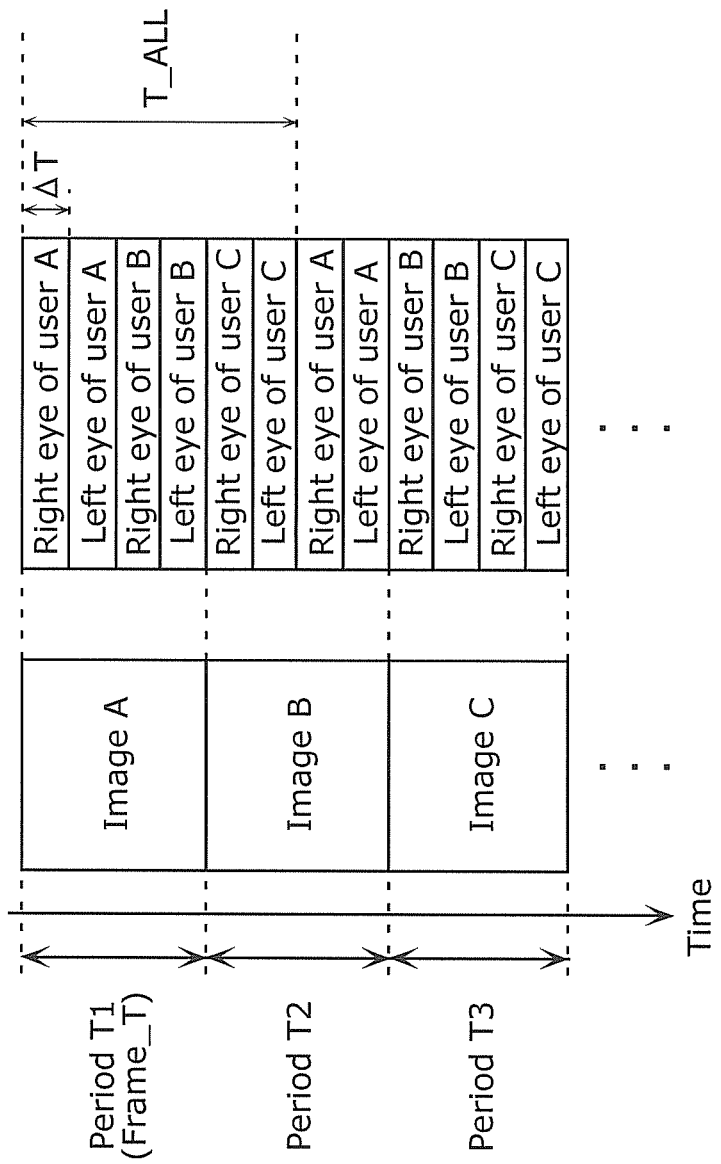
FIG. 20 illustrates a relationship between frames displayed on the liquid crystal panel and positions to which light deflected by the light deflector is directed when three users are viewing images on the liquid crystal panel.

However, a problem arises when there are more users to view images displayed on the liquid crystal panel 503. FIG. 20 illustrates a relationship between frames displayed on the liquid crystal panel 503 and positions to which light deflected by the light deflector 502 is directed when three users A, B and C are viewing images on the liquid crystal panel 503. When the three users A, B, and C are viewing images displayed on the liquid crystal panel 503, the positions to which light deflected by the light deflector 502 is directed are switched sequentially from the right eye of the user A, the left eye of the user A, the right eye of the user B, the left eye of the user B, the right eye of the user C, and then to the left eye of the user C as shown in FIG. 20. On the other hand, the frames displayed on the liquid crystal panel 503 are switched sequentially from the frame of the image A, the frame of the image B, and then to the frame of the image C as shown in FIG. 20.

In a period T1, in which the image A is displayed, light deflected by the light deflector 502 is deflected only toward the right and left eyes of the user A and the user B but not to the right and left eyes of the user C. As a result, in the period T1, the user A and the user B are allowed to see the image B, but the user C is not allowed to see the image A. Similarly, in a period T2, in which the image B is displayed, light deflected by the light deflector 502 is not directed toward the right and left eyes of the user B, and in a period T3, in which the image C is displayed, light deflected by the light deflector 502 is not directed toward the right and left eyes of the user A. As a result, the user B is allowed to see the image B in the period T2 and the user A is not allowed to see the image C in the period T3.

This problem arises because sequentially deflecting light toward the right and left eyes of all the users takes longer time when more users are viewing an image on the liquid crystal panel 503. Here, a relational expression T_ALL=2×N×ΔT is true, where ΔT is a unit deflection time to be taken to deflect light toward an eye of users, N is the total number of users viewing an image on the liquid crystal panel 503, and T_ALL is a time to be taken to deflect light toward each eye of all the users in sequence. If a time Frame_T which is a display time during which a frame of an image is displayed on the liquid crystal panel 503 is shorter than T_ALL, some users cannot see the image as described above. This causes decrease in the frame rate of images to be displayed on the liquid crystal panel 503, and therefore a problem of deterioration in image quality arises, such as flickering.

According to an exemplary embodiment disclosed herein, a display device which displays an image includes: a light source which emits light; a light deflector having a deflection region in which the light from the light source is deflected toward a predetermined position; a display panel on which the image is formed by the light from the light deflector; and a control unit configured to determine a total number of right and left eyes of one or more users viewing the image displayed on the display panel, and control operation of the light deflector based on the determined total number of right and left eyes so that the light deflected by the light deflector is directed alternately toward a right eye and a left eye of each of the one or more users, wherein the control unit is configured to segment the deflection region into a plurality of deflection subregions based on the determined total number of right and left eyes, and control light deflection in the deflection subregions so that the light from the light source is deflected toward different positions at the same time.

With this, it is possible to display images with less deterioration in image quality even while multiple users are viewing the images.

For example, the control unit included in the display device may be configured to set a total number M of the deflection subregions that satisfies a relational expression (N×ΔT)/M≤Frame_T, where ΔT is a unit deflection time to be taken for the light deflector to deflect light from the light source toward any eye of the one or more users, Frame_T is a display time during which a frame of the image is displayed on the display panel, and N is the determined total number of right and left eyes.

With this, it is possible to deflect light toward each of the detected eyes within the display time Frame_T.

For example, the control unit included in the display device may be configured to control the light deflection in the deflection subregions so that the light is deflected toward the right and left eyes of the one or more users within the display time Frame_T.

With this, it is possible to deflect light toward each of the detected eyes within the display time Frame_T.

For example, in the display device, each of the deflection subregions may be discontinuous and the deflection subregions may be interlaced.

With this, it is possible to show users images with less unnaturalness even when the deflection region is segmented into such deflection subregions.

For example, in the display device, the deflection region may have light deflector elements each of which is a smallest unit for controlling a direction of light deflection, the light deflector elements may be arranged in a predetermined direction, the display panel may include pixels arranged in the predetermined direction, and each of the light deflector elements may be a size in the predetermined direction smaller than a size of each of the pixels in the predetermined direction.

With this, it is possible to allow each pixel to receive light from a plurality of light deflector elements, and thereby preventing what is called pixel failure.

For example, the control unit included in the display device may be configured to identify a specific user from the users, and control the light deflection in the deflection subregions so that the light is deflected more frequently toward the right and left eyes of the specific user than toward the right and left eyes of any other user among the users.

With this, it is possible to deflect light from the light source preferentially toward the specific user among the plurality of users.

For example, the control unit included in the display device may be configured to segment the deflection region into a first deflection subregion and a second deflection subregion, and control the light deflection in the first deflection subregion so that the light from the light source is deflected toward the right eye of each of the one or more users, and control the light deflection in the second deflection subregion so that the light from the light source is deflected toward the left eye of each of the one or more users.

With this, it is possible to allow the user to recognize an image obtained by fusing optical images.

For example, when the determined total number of right and left eyes is less than or equal to a predetermined number, the control unit included in the display device may be configured to avoid segmenting the deflection region into the plurality of deflection subregions.

With this, it is possible to deflect light from the light source toward a small number of users viewing images without segmenting each deflection region into deflection subregions.

According to an exemplary embodiment disclosed herein, a method for controlling a display device including: a light source which emits light; a light deflector having a deflection region in which light from the light source is deflected toward a predetermined position; and a display panel on which an image is formed by the light from the light deflector, includes: determining a total number of right and left eyes of one or more users viewing the image displayed on the display panel; segmenting the deflection region into a plurality of deflection subregions based on the determined total number of right and left eyes; and controlling light deflection in the deflection subregions so that the light from the light source is deflected toward different positions at the same time.

In this way, it is possible to reduce deterioration in quality of images even while multiple users are viewing the images.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Embodiments

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Configuration of Liquid Crystal Display Device

Figure 1:
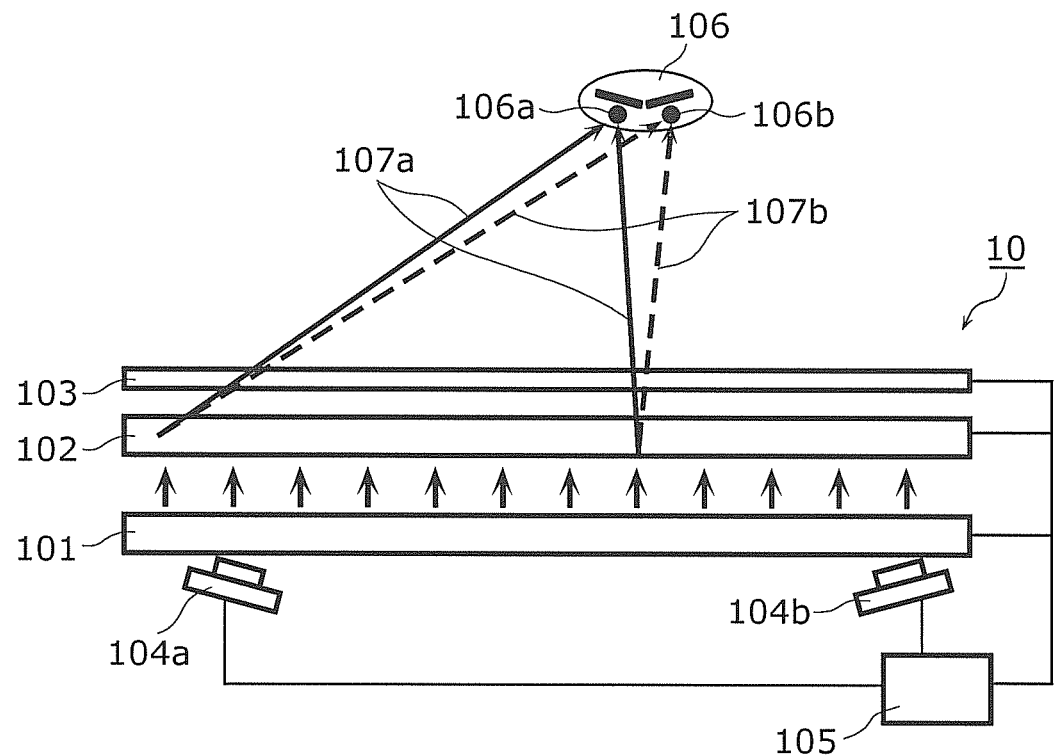
FIG. 1 illustrates a liquid crystal display device according to Embodiment 1.

FIG. 1 illustrates a liquid crystal display device 10 according to Embodiment 1. The liquid crystal display device 10 illustrated in FIG. 1 is a display device including a light source 101, a light deflector 102, a liquid crystal panel 103 (a display panel), a pair of eye cameras 104a and 104b, and a control unit 105. The liquid crystal display device 10 is, for example, included in a television set which functions as a glasses-free 3D display and as a privacy display.

The light source 101 is a light source which emits light over its surface and faces a light entry face of the light deflector 102. The light from light source 101 enters the light deflector 102 through the light entry face. For example, the light source 101 is composed of multiple of white light-emitting diodes (LEDs) arranged in a plane. Optionally, the light source 101 may be composed of multiple of red, blue, and green LEDs arranged in a plane.

Optionally, the light source 101 may include a light guide plate, which is not shown in FIG. 1. In this case, the light source 101 may be composed of a light guide plate, LEDs arranged on a side surface of the light guide plate, a cold cathode fluorescent lamp (CCFL), and a laser.

Figure 2A:
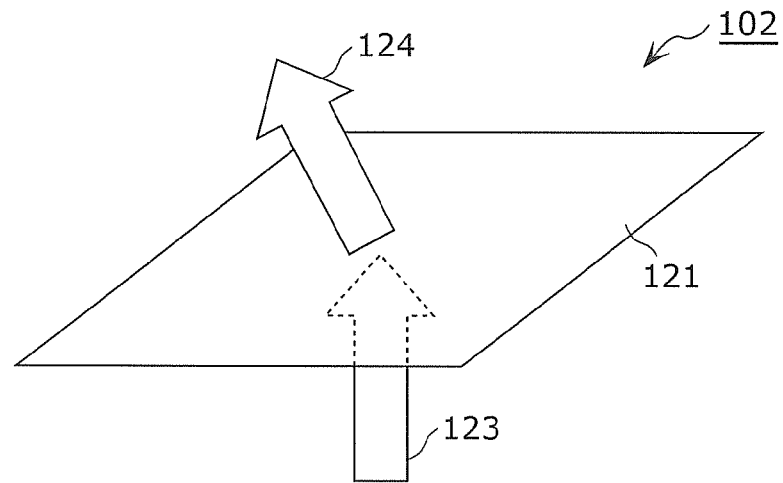
FIG. 2A is a perspective view schematically illustrating light from a light source deflected by the light deflector.

The light deflector 102 has a function to deflect light incident through the light entry face and modulate the direction of the deflection. FIG. 2A is a perspective view schematically illustrating light from the light source 101 deflected by the light deflector 102. As shown in FIG. 2A, the light deflector 102 has a deflection region 121 in which light from the light source 101 is deflected toward a predetermined position. The deflection region 121 has light deflector elements 120 arranged in a matrix (see FIG. 3A, which is described below). Each of the light deflector elements 120 is the smallest unit for control of light deflection and deflects light by taking advantage of modulation of the refractive index of liquid crystal upon application of voltage.

The deflection region 121 is segmented into deflection subregions by the control unit 105, which will be described later. When the deflection region 121 is not segmented as shown in FIG. 2A, light from the light source 101 enters the deflection region 121 approximately vertically to the deflection region 121 as indicated by an arrow 123 in FIG. 2A. After entering the deflection region 121, the light is deflected toward a predetermined position (for example, a right eye 106a of a user 106 viewing an image displayed on the liquid crystal panel 103) as indicated by an arrow 124 in FIG. 2A.

Figure 2B:
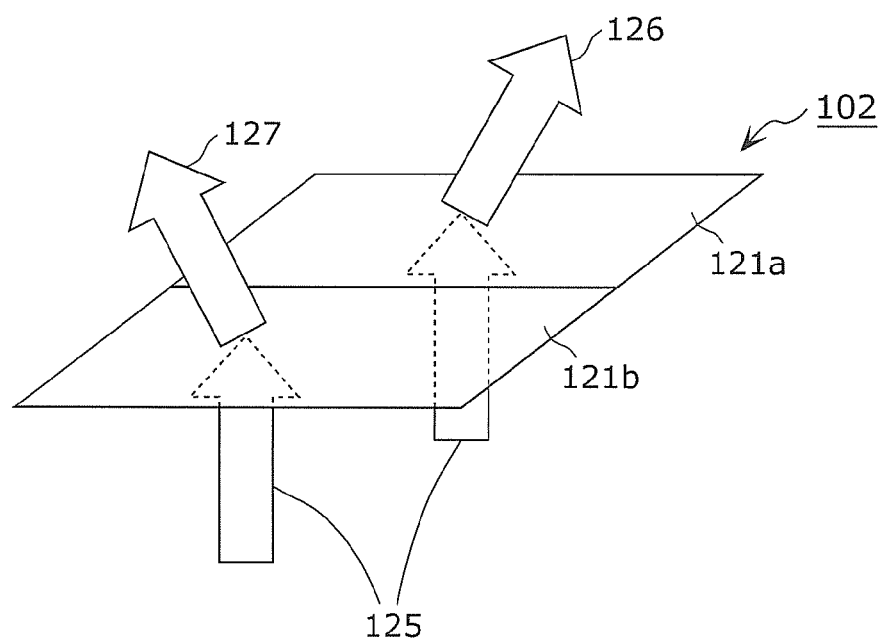
FIG. 2B is a perspective view schematically illustrating a deflection region segmented into a first deflection subregion and a second deflection subregion.

FIG. 2B is a perspective view schematically illustrating the deflection region 121 segmented into a first deflection subregion 121a and a second deflection subregion 121b. For example, the deflection region 121 is segmented into two deflection subregions: the first deflection subregion 121a and the second deflection subregion 121b. As shown in FIG. 2B, the first deflection subregion 121a is a continuous region in the upper half of the deflection region 121, and the second deflection subregion 121b is a continuous region in the lower half of the deflection region 121. Light from the light source 101 enters the first deflection subregion 121a and the second deflection subregion 121b to the deflection region 121 approximately vertically the deflection subregions as indicated by arrows 125 in FIG. 2B. In the first deflection subregion 121a, the light is deflected toward a first position (for example, the right eye 106a of the user 106) as indicated by an arrow 126 in FIG. 2B. In the second deflection subregion 121b, the light is deflected toward a second position, which is different from the first position (for example, a right eye of a user other than the user 106), as indicated by an arrow 127 in FIG. 2B. In this manner, it is possible to deflect the light in the first deflection subregion 121a and the light in the second deflection subregion 121b toward different positions at the same time.

The liquid crystal panel 103 is disposed facing a light exit face of the light deflector 102. The liquid crystal panel 103 includes pixels 130 arranged in a matrix in its display area (see FIG. 3A described later). Light exits the light deflector 102 through the light exit face and forms an image on the liquid crystal panel 103.

Figure 3A:
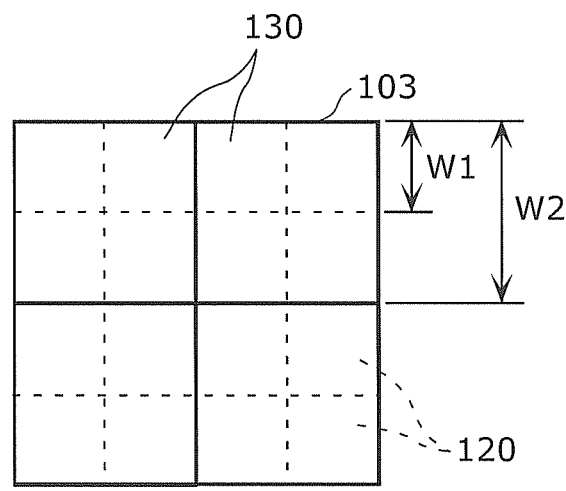
FIG. 3A is a plan view illustrating a configuration of light deflector elements and pixels.
Figure 3B:
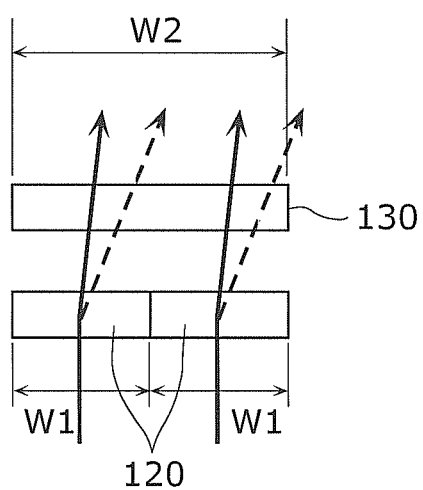
FIG. 3B is a lateral view illustrating the configuration of the light deflector elements and the pixels.

FIG. 3A is a plan view illustrating a configuration of the light deflector elements 120 and the pixels 130. FIG. 3B is a lateral view illustrating the configuration of the light deflector elements 120 and the pixels 130. As illustrated in FIG. 3A, the light deflector elements 120 are arranged in vertical and horizontal directions in FIG. 3A to form a matrix, and the pixels 130 are arranged in the vertical and horizontal directions of FIG. 3A to form a matrix. One of the vertical and horizontal directions is hereinafter referred to as a "predetermined direction". The length W1, which is the size of each of the light deflector elements 120 in the predetermined direction, is approximately half the length W2, which is the size of each of the light pixels 130 in the predetermined direction. In this configuration, each of the pixels 130 receives light from a plurality of the light deflector element 120, and what is called pixel failure is thereby reduced.

Each of the eye cameras 104a and 104b images the right eye 106a and the left eye 106b of the user 106 viewing an image on the liquid crystal panel 103. The eye cameras 104a and 104b each send an image signal to the control unit 105.

The control unit 105 controls the light deflector 102 based on the image signals sent from the eye cameras 104a and 104b. Furthermore, the control unit 105 controls light output of the light source 101 and images to be displayed on the liquid crystal panel 103.

Figure 4:
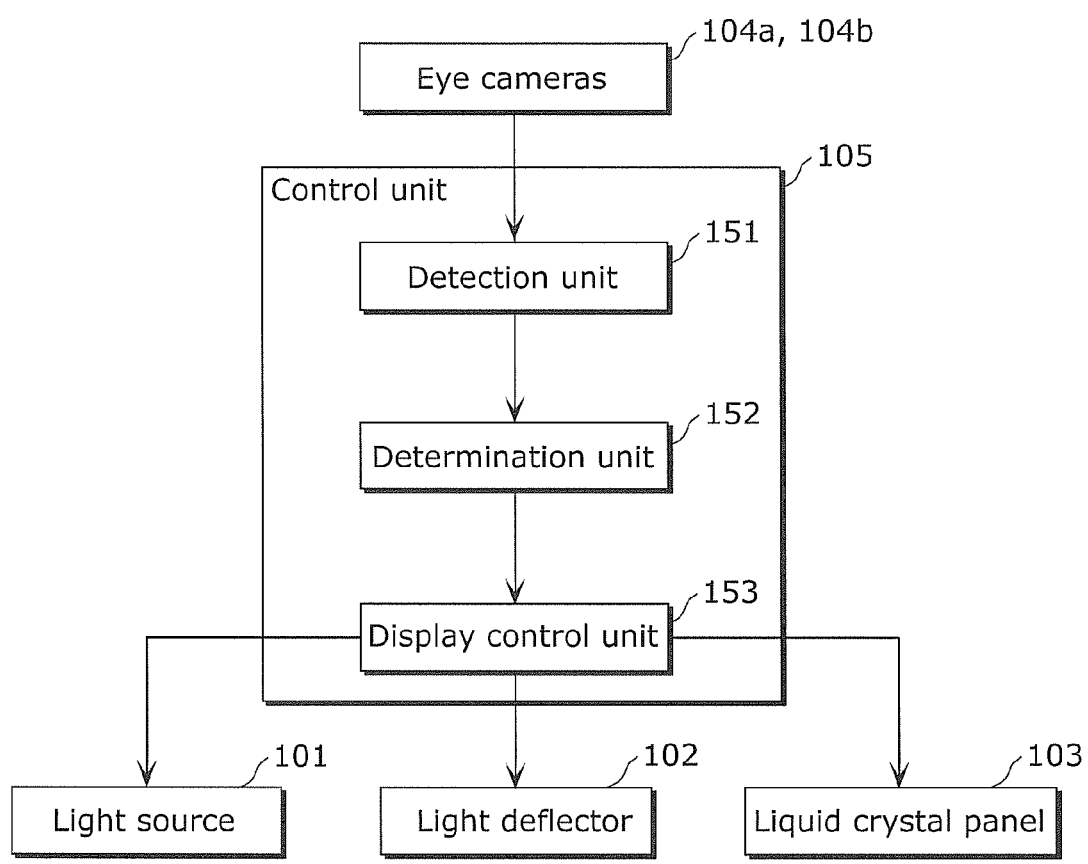
FIG. 4 is a block diagram illustrating a basic configuration of the control unit.

FIG. 4 is a block diagram illustrating a basic configuration of the control unit 105. As illustrated in FIG. 4, the control unit 105 includes a detection unit 151, a determination unit 152, and a display control unit 153.

The detection unit 151 determines the total number of right and left eyes of one or more users viewing an image on the liquid crystal panel 103 based on image signals from the pair of the eye cameras 104a and 104b. For example, when a single user 106 is viewing an image on the liquid crystal panel 103 as illustrated in FIG. 1, the detection unit 151 determines the total number of right and left eyes as two.

The determination unit 152 segments the deflection region 121 into deflection subregions based on the total number of right and left eyes determined by the detection unit 151. Specific operation of the determination unit 152 will be described in detail later.

The display control unit 153 controls operation of the light source 101, the light deflector 102, and the liquid crystal panel 103 based on the total number of the deflection subregions into which the deflection region 121 is segmented by the determination unit 152.

[Functions of Liquid Crystal Display Device]

When the liquid crystal display device 10 functions as a glasses-free 3D display, the display control unit 153 displays right-eye images and left-eye images on the liquid crystal panel 103 alternately through time. Furthermore, the display control unit 153 controls light deflection performed by the light deflector 102, based on image signals sent from the eye cameras 104a and 104b in the following manner.

The light deflector 102 deflects light from the light source 101 toward the right eye 106a of the user 106 for a predetermined period of time. The light from the light deflector 102 thereby converges at the right eye 106a of the user 106 as indicated by the arrows with solid line 107a in FIG. 1. The liquid crystal panel 103 displays a right-eye image during the predetermined period of time.

Subsequently, the light deflector 102 deflects light from the light source 102 toward the left eye 106b of the user 106 for a predetermined period of time. The light from the light deflector 102 thereby converges at the left eye 106b of the user 106 as indicated by the arrows with dashed line 107b in FIG. 1. The liquid crystal panel 103 displays a left-eye image during the subsequent predetermined period of time.

In this manner, light from the light deflector 102 converges at the right eye 106a and left eye 106b of the user 106 alternately through time, and thereby allowing the user 106 to see the images displayed on the liquid crystal panel 103 as a 3D image.

When the liquid crystal display device 10 functions as a privacy display, the display control unit 153 uses a setting with which the right-eye image and left-eye image displayed on the liquid crystal panel 103 are identical. This allows the user 106 to see the images displayed on the liquid crystal panel 103 as a 2D image, and users other than the user 106 cannot see the images on the liquid crystal panel 103. In Embodiment 1, a case where the liquid crystal display device 10 functions as a privacy display shall be described below.

[Method for Controlling Liquid Crystal Display Device]

Figure 5:
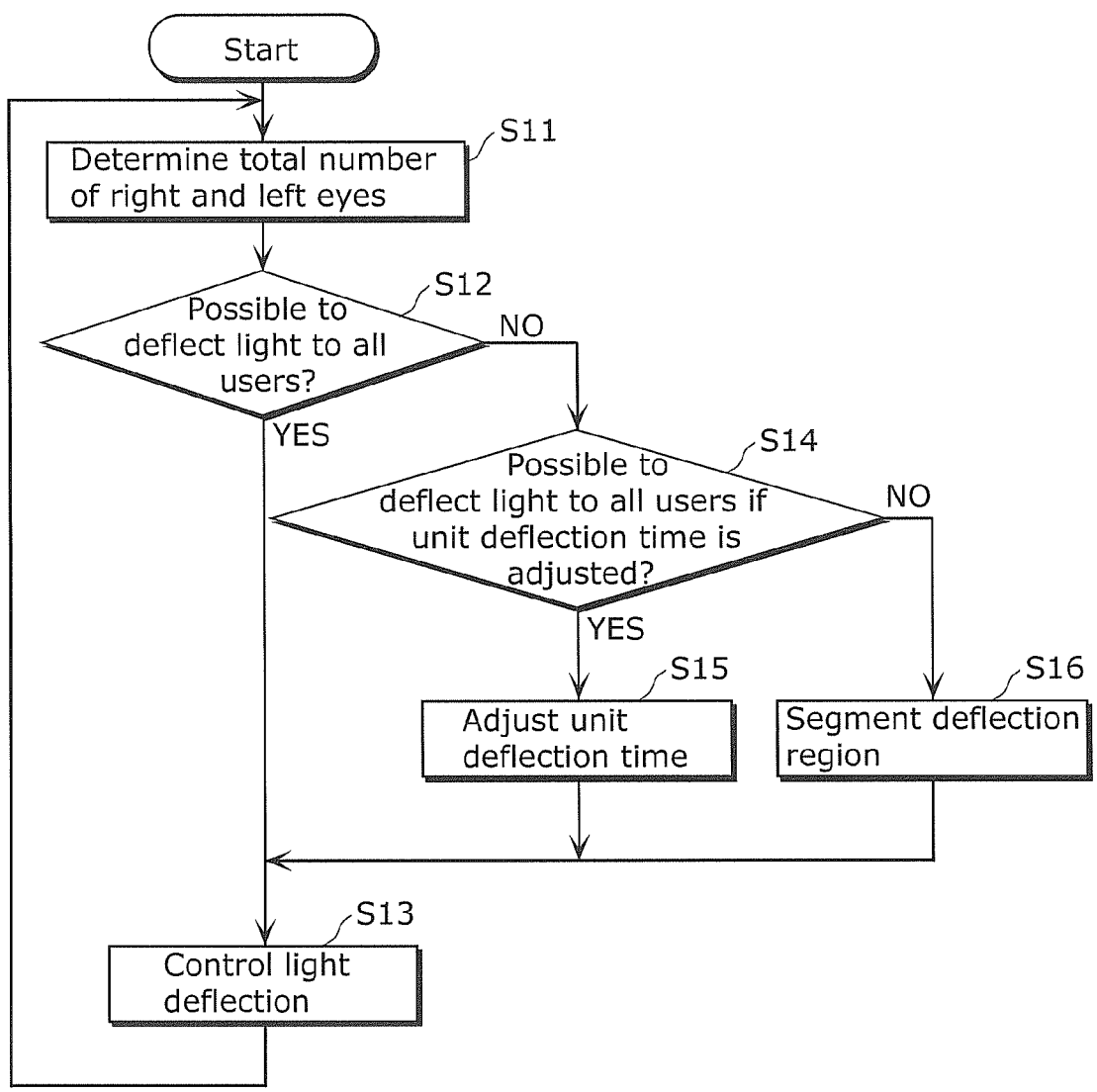
FIG. 5 is a flowchart illustrating a method for controlling the liquid crystal display device according to Embodiment 1.

A method for controlling the liquid crystal display device 10 when a plurality of users is viewing images on the liquid crystal panel 103 shall be described below with reference to FIG. 5. FIG. 5 is a flowchart illustrating the method for controlling the liquid crystal display device 10 according to Embodiment 1. In the case described below, the deflection region 121 is not segmented into deflection subregions at the beginning of the control of the liquid crystal display device 10.

First, the detection unit 151 determines the total number of right and left eyes of the users viewing images on the liquid crystal panel 103 based on image signals sent from the pair of the eye cameras 104a and 104b. For example, when three users are viewing images on the liquid crystal panel 103, the detection unit 151 determines the total number of right and left eyes as six.

Note that the detection unit 151 may determine the total number of right and left eyes using a variety of methods, and the methods are not limited to a specific method. For example, the detection unit 151 may determine the total number of right and left eyes by extracting the shapes of the right and left eyes of users based on feature amounts indicated by the image signals from the eye cameras 104a and 104b. Optionally, the detection unit 151 may determine the total number of right and left eyes by determining a total number of the faces of users by extracting the contours of the faces based on feature amounts indicated by the image signals from the eye cameras 104a and 104b, and doubling the total number of the faces.

Next, the determination unit 152 determines whether or not it is possible to deflect light toward the right and left eyes of all the users, based on the total number of right and left eyes determined by the detection unit 151 (S12). Specifically, the determination unit 152 uses Equation 1 below to determine the magnitude relationship between a deflection time to be taken to deflect light toward each eye of all the users and a display time during which a frame (or an image) is displayed on the liquid crystal panel 103.

$$N \times \Delta T > \text{Frame\_}T \quad \text{(Equation 1)}$$

In Equation 1, N is the total number of the right and left eyes determined by the detection unit 151, $\Delta T$ is a unit deflection time currently taken for the light deflector 102 to deflect light from the light source 101 toward an eye of users, and Frame_T is a display time during which a frame is displayed on the liquid crystal panel 103. The determination unit 152 holds data on the unit deflection time $\Delta T$ and the display time Frame_T. In Embodiment 1, the display control unit 153 is capable of adjusting the unit deflection time $\Delta T$ by changing voltage to be applied to the light deflector elements 120.

When Equation 1 is not true (S12, YES), the determination unit 152 determines that it is possible to deflect light toward the right and left eyes of all the users within the display time Frame_T without adjusting the unit deflection time $\Delta T$. Equation 1 is not true when, for example, one or two users are viewing images displayed on the liquid crystal panel 103. In this case, the display control unit 153 controls light deflection performed by the light deflector 102 in the above-described manner, without changing the unit deflection time ΔT or segmenting the deflection region 121 into deflection subregions (S13).

When Equation 1 is true (S12, NO), the determination unit 152 determines that it is not possible to deflect light toward the right and left eyes of all the users during the unit deflection time ΔT within the display time Frame_T. Equation 1 is true when, for example, three or four users are viewing images displayed on the liquid crystal panel 103. In this case, the determination unit 152 determines whether or not adjusting the unit deflection time ΔT makes it possible to deflect light toward the right and left eyes of all the users within the display time Frame_T (S14). Specifically, the determination unit 152 uses Equation 2 below to determine the magnitude relationship between a deflection time to be taken to deflect light toward the right and left eyes of all the users and a display time during which a frame is displayed on the liquid crystal panel 103 when the unit deflection time ΔT is minimized. Minimizing the unit deflection time ΔT is equivalent to maximizing the rate of changing directions of light deflection by the light deflector 102.

$$N \times \Delta T\_MIN > Frame\_T \quad \text{(Equation 2)}$$

In Equation 2, ΔT_MIN is a minimum unit deflection time within an adjustable range. The minimum unit deflection time ΔT_MIN is, for example, the shortest time to be taken to allow a user to see an image when light is deflected toward the right or left eye of the user.

When Equation 2 is not true (S14, YES), the determination unit 152 determines that it is possible to deflect light toward the right and left eyes of all the users within the display time Frame_T by using a unit deflection time ΔT adjusted to the minimum unit deflection time ΔT_MIN. In this case, the determination unit 152 shortens the unit deflection time ΔT to calculate a unit deflection time ΔT' (ΔT_MIN≤ΔT'<ΔT) which does not satisfy Equation 1 (S15). Next, the display control unit 153 shortens the unit deflection time from ΔT to ΔT' and controls light deflection performed by the light deflector 102 in the above-described manner, without segmenting the deflection region 121 into deflection subregions (S13).

When Equation 2 is not true (S14, NO), the determination unit 152 determines that it is not possible to deflect light toward the right and left eyes of all the users within the display time Frame_T even by using the minimum unit deflection time ΔT_MIN adjusted from the unit deflection time ΔT. Equation 2 is not true when, for example, five or more users are viewing images displayed on the liquid crystal panel 103. In this case, the determination unit 152 segments the deflection region 121 into deflection subregions based on the total number N of right and left eyes determined by the detection unit 151 (S16). Specifically, the determination unit 152 sets the total number of deflection subregions which satisfies a relational expression, Equation 3 below.

$$(N \times \Delta T\_MIN)/M \leq Frame\_T \quad \text{(Equation 3)}$$

In Equation 3, M is the total number of deflection subregions in the deflection region 121.

For example, when a display time Frame_T is 16 msec, a minimum unit deflection time ΔT_MIN is 4 msec, and the determined total number N of right and left eyes is six, the total number M of deflection subregions to satisfy the relational expression Equation 3 is two. Then, the deflection region 121 is segmented into two deflection subregions as exemplified in FIG. 2B, the first deflection subregion 121a and the second deflection subregion 121b. Subsequently, the display control unit 153 shortens the unit deflection time ΔT to ΔT_MIN, which is the minimum, and changes the total number M of the deflection subregions to two, and controls light deflection performed by the light deflector 102 in the above-described manner using ΔT_MIN and M (S13).

As described above, when the deflection region 121 is segmented into the first deflection subregion 121a and the second deflection subregion 121b, the display control unit 153 can cause light from the light source 101 in the first deflection subregion 121a and the second deflection subregion 121b to be deflected toward two different positions at the same time. The light deflected in the first deflection subregion 121a and the light deflected in the second deflection subregion 121b thereby enter the right and left eyes of all the users within the display time Frame_T.

After segmenting the deflection region 121 into deflection subregions, the determination unit 152 determines a deflection order for each of the deflection subregions such that light is deflected toward the right and left eyes of all the users within the display time Frame_T. The deflection order means an order of positions toward which light is deflected. The deflection order is not limited to a specific order. For example, when deflection subregions 1 to M are provided for positions 1 to N (where 2M=N), light deflected by the deflection subregions 1 to M may be first directed to the positions 1 to N, and then to the positions M+1 to 2M.

In Embodiment 1, the determination unit 152 identifies a specific user from among a plurality of users based on image signals from the pair of the eye cameras 104a and 104b. The determination unit 152 then controls light deflection performed by the deflection subregions so that light is deflected more frequently toward the right and left eyes of the specific user than toward the right and left eyes of the users other than the specific user. For example, such a specific user may be identified using a method in which a user located at a position corresponding to the center of the liquid crystal panel 103 is identified as a specific user, or a method in which a user having eyes identical in shape to pre-registered eyes (for example, the eyes of the owner of the liquid crystal display device 10) is identified as a specific user.

Light deflection performed by the light deflector 102 shall be described below with reference to FIG. 6, based on a case where the determined total number N of right and left eyes is six, and the total number M of deflection subregions is two. FIG. 6 illustrates a relationship between frames displayed on the liquid crystal panel 103 and positions to which light deflected by the light deflector 503 is directed when three users A, B and C are viewing images displayed on the liquid crystal panel 103. In the case described below, the deflection region 121 is segmented into two deflection subregions as illustrated in FIG. 2B, that is, the first deflection subregion 121a and the second deflection subregion 121b, and the determination unit 152 identifies the user A as a specific user from among the users A, B, and C.

In a period T1, in which the image A is displayed, light deflected in the first deflection subregion 121a is directed toward the right and left eyes of the user A and the user B, and light deflected in the second deflection subregion 121b is directed toward the right and left eyes of the user A and the user C. The users A, B, and C thereby see the image A in the period T1. Similarly, the users A, B, and C see an image B in a period T2 and an image C in a period T3.

Note that the eyes of the user B and the eyes of the user C receive light deflected in the first deflection subregion 121a and the second deflection subregion 121b, respectively. The right and left eyes of the users B and C receive light deflected under such control of light deflection in each of the periods T1 to T3, so that flickering due to a low frame rate can be avoided.

The process is repeated from Steps S11 to S16 in a predetermined period, and thereby a plurality of users can see images displayed on the liquid crystal panel 103 with less deterioration in image quality due to an insufficient rate of changing directions of light deflection by the light deflector 102.

Note that the minimum unit deflection time ΔT_MIN in the relational expression Equation 3 can be replaced with a unit deflection time ΔT. By doing this, the rate of changing directions of light deflection by the light deflector 102 is kept lower so that the light deflector 102 can be driven at a lower voltage, and power consumption is thereby saved.

Although deflection is controlled so that light is preferentially deflected toward the right and left eyes of the user A in the above-described case, the deflection according to Embodiment 1 may be also controlled so that light is deflected evenly toward the right and left eyes of the users A, B, and C.

Although the display time Frame_T in which a frame is displayed on the liquid crystal panel 103 is constant in the above-described case, the display control unit 153 according to Embodiment 1 may be configured to adjust the display time Frame_T. In this case, the display time Frame_T may be adjusted instead of a unit deflection time ΔT in above-described Step S15.

Although the deflection region 121 is segmented into two deflection subregions in the above-described case, the deflection region 121 according to Embodiment 1 may be segmented into three or more deflection subregions when more users are viewing images displayed on the liquid crystal panel 103. Configurations of the deflection subregions are not limited to a specific pattern.

Furthermore, fusing of optical images may be taken into consideration for determination of a deflection order for each deflection subregion by the determination unit 152. Fusing of optical images refers to recognition of different images entering the right and left eyes of a user as a single image into which the user fuses the different images. In this case, for example, the display control unit 153 controls light deflection in the first deflection subregion 121a so that light from the light source 101 is deflected toward the right eye of a user and light deflection in the second deflection subregion 121b so that light from the light source 101 is deflected toward the left eye of the user in the period T1 in which an image A is displayed on the liquid crystal panel 103. The right eye of the user thereby receives an upper half of the image A and the left eye of the user receives a lower half of the image A, so that the user can recognize the whole image A by fusing the images.

Furthermore, a lens, which is not shown in the drawings, may be provided between the light deflector 102 and the liquid crystal panel 103 in order to further deflect light from the light deflector 102. This provides the liquid crystal panel 103 with a wider viewing angle so that the user 106 can see images displayed on the liquid crystal panel 103 even at a relatively close viewing position.

The light deflector 102 according to Embodiment 1 may include elements including MEMS mirrors instead of the light deflector elements 120. The light deflector 102 including MEMS mirrors has a relatively large deflection angle, and thereby allows the user 106 to see images such as 3D images even when the user 106 moves the head by a relatively large amount with respect to the liquid crystal panel 103.

Embodiment 2

Figure 7A:
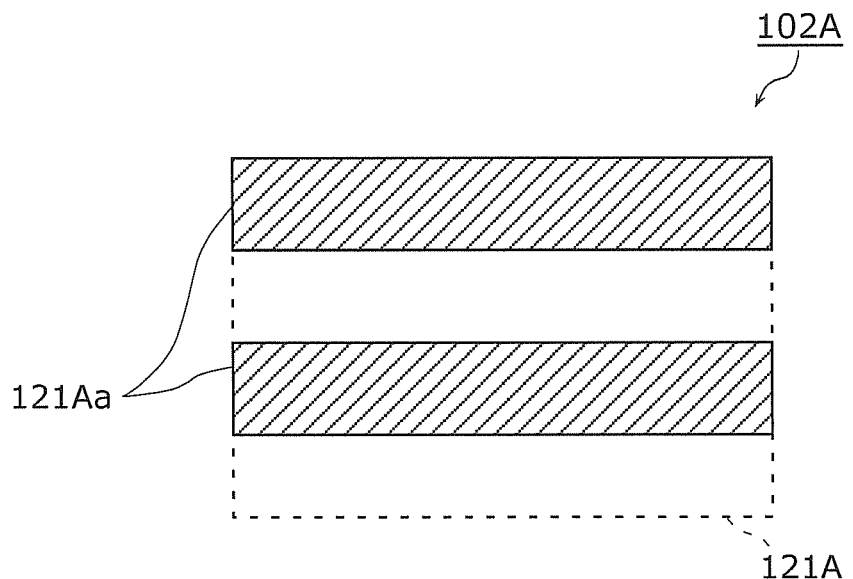
FIG. 7A is a plan view schematically illustrating a first deflection subregion and a second deflection subregion into which a deflection region in a liquid crystal display device according to Embodiment 2 is segmented.
Figure 7B:
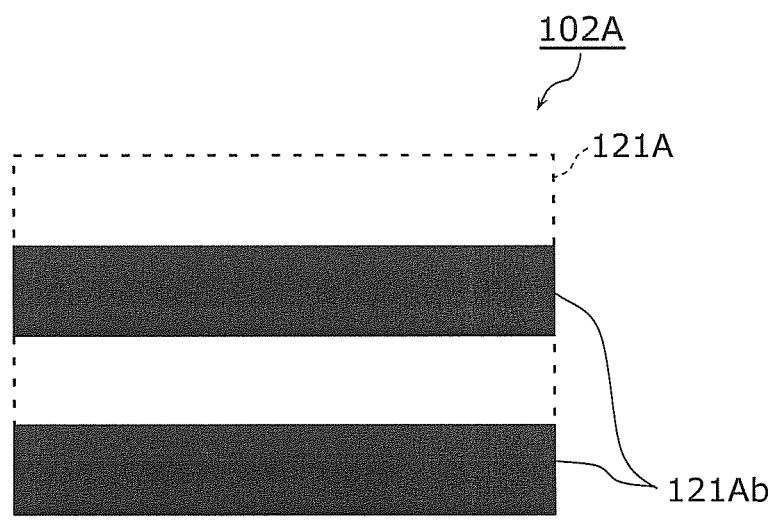
FIG. 7B is a plan view schematically illustrating a first deflection subregion and a second deflection subregion into which a deflection region in a liquid crystal display device according to Embodiment 2 is segmented.

FIG. 7A and FIG. 7B are schematic plan views respectively illustrating a first deflection subregion 121Aa and a second deflection subregion 121Ab into which a deflection region 121A in a liquid crystal display device according to Embodiment 2 is segmented. In the following embodiments, constituent elements identical to those already described in Embodiment 1 are denoted with the same reference numerals and thus description thereof will be omitted.

As illustrated in FIG. 7A and FIG. 7B, the deflection region 121A of a light deflector 102A is segmented into two deflection subregions, the first deflection subregion 121Aa and the second deflection subregion 121Ab. In Embodiment 2, the first deflection subregion 121Aa and the second deflection subregion 121Ab are interlaced, and each of them is discontinuous. The first deflection subregion 121Aa is composed of odd lines of the deflection region 121A, and the second deflection subregion 121Ab is composed of even lines of the deflection region 121A.

Figure 8:
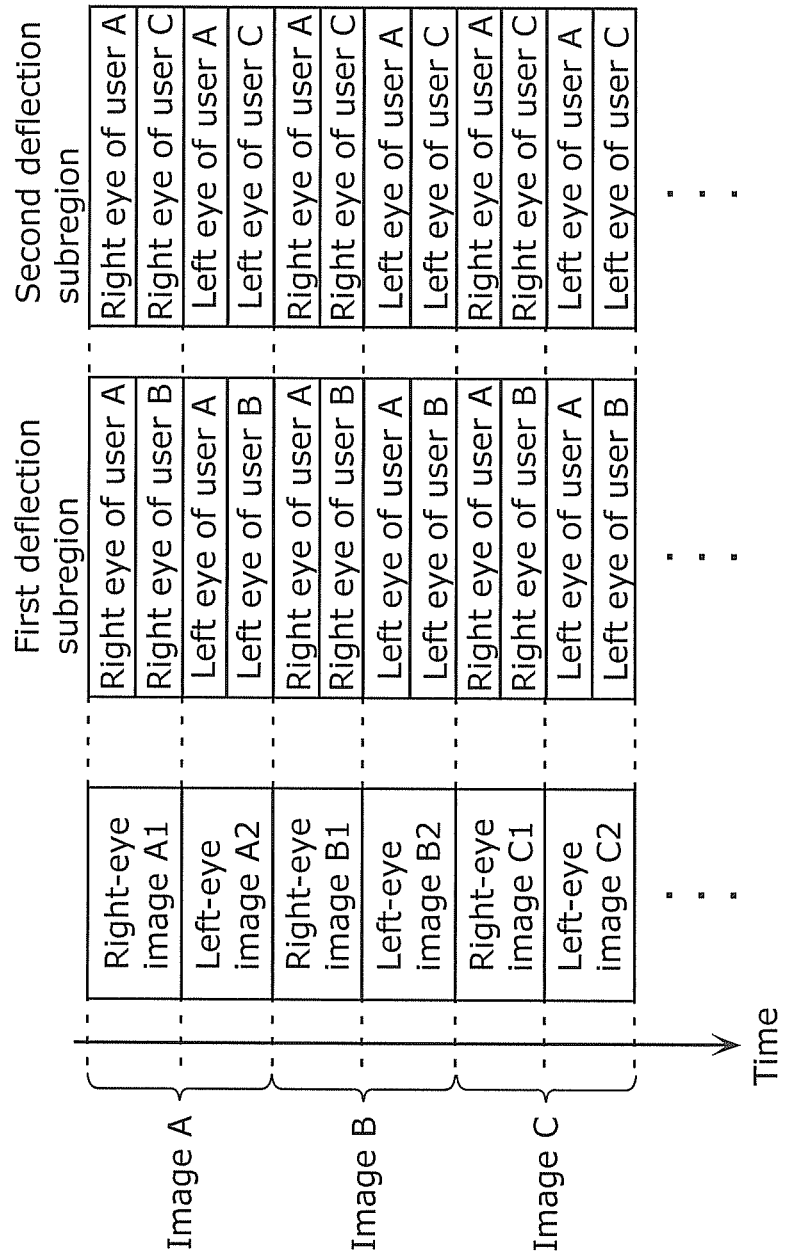
FIG. 8 illustrates a relationship between images displayed on a liquid crystal panel and positions to which light deflected by a light deflector is directed when three users are viewing images displayed on the liquid crystal panel.

FIG. 8 illustrates a relationship between images displayed on a liquid crystal panel 103 (see FIG. 1) and positions to which light deflected by the light deflector 102A is directed when three users A, B and C are viewing the images displayed on the liquid crystal panel 103. In Embodiment 2, a case where a liquid crystal display device functions as a glasses-free 3D display shall be described below. The determination unit 152 in this case identifies the user A as a specific user among the users A, B, and C as an example.

In a period in which a right-eye image A1 is displayed, light deflected in the first deflection subregion 121Aa is directed toward the right eyes of the user A and the user B, and light deflected in the second deflection subregion 121Ab is directed toward the right eyes of the user A and the user C. The right eyes of the users A, B, and C thereby receive the right-eye image A1 in the period in which the right-eye image A1 is displayed.

In a period in which a left-eye image A2 is displayed, light deflected in the first deflection subregion 121Aa is directed toward the left eyes of the user A and the user B, and light deflected in the second deflection subregion 121Ab is directed toward the left eyes of the user A and the user C. The left eyes of the users A, B, and C thereby receive the left-eye image A2 in the period in which the left-eye image A2 is displayed.

The users A, B, and C thereby can see an image A corresponding to the right-eye image A1 and left-eye image A2 as a 3D image.

Similarly, the users A, B, and C can see an image B corresponding to a right-eye image B1 and a left-eye image B2 as a 3D image, and an image C corresponding to a right-eye image C1 and a left-eye image C2 as a 3D image. The display device in Embodiment 2 thus produces the same effect as the effect produced by the display device in Embodiment 1.

Embodiment 3

Figure 9:
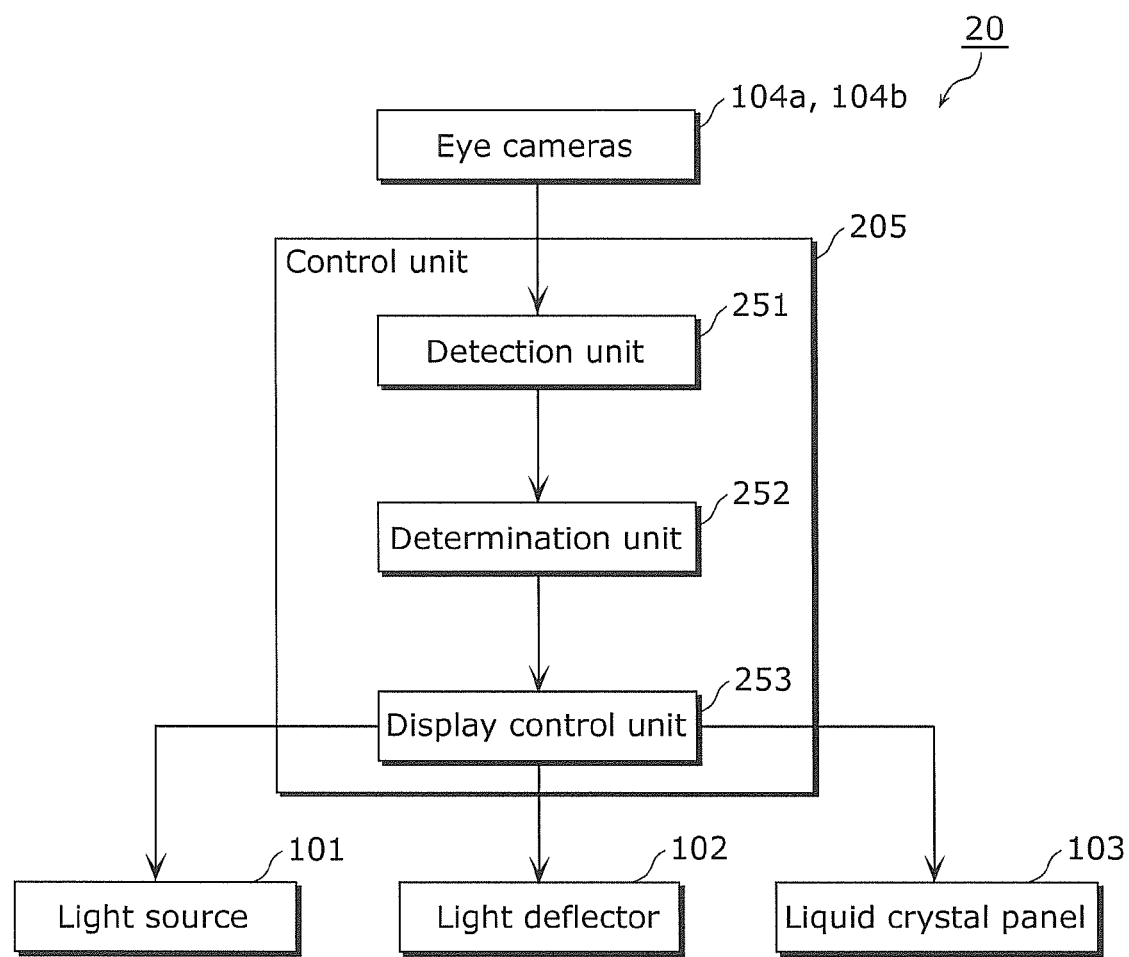
FIG. 9 is a block diagram illustrating a functional configuration of a control unit of a liquid crystal display device according to Embodiment 3.

FIG. 9 is a block diagram illustrating a functional configuration of a control unit 205 of a liquid crystal display device 20 according to Embodiment 3. As illustrated in FIG. 9, the control unit 205 includes a detection unit 251, a determination unit 252, and a display control unit 253.

The detection unit 251 determines the total number of right and left eyes of one or more users viewing an image on the liquid crystal panel 103 based on image signals from the pair of the eye cameras 104a and 104b, and detects a range 210 irradiated with light deflected by the light deflector 102 (hereinafter referred to as a deflection range) (see FIG. 11 described later).

Figure 10:
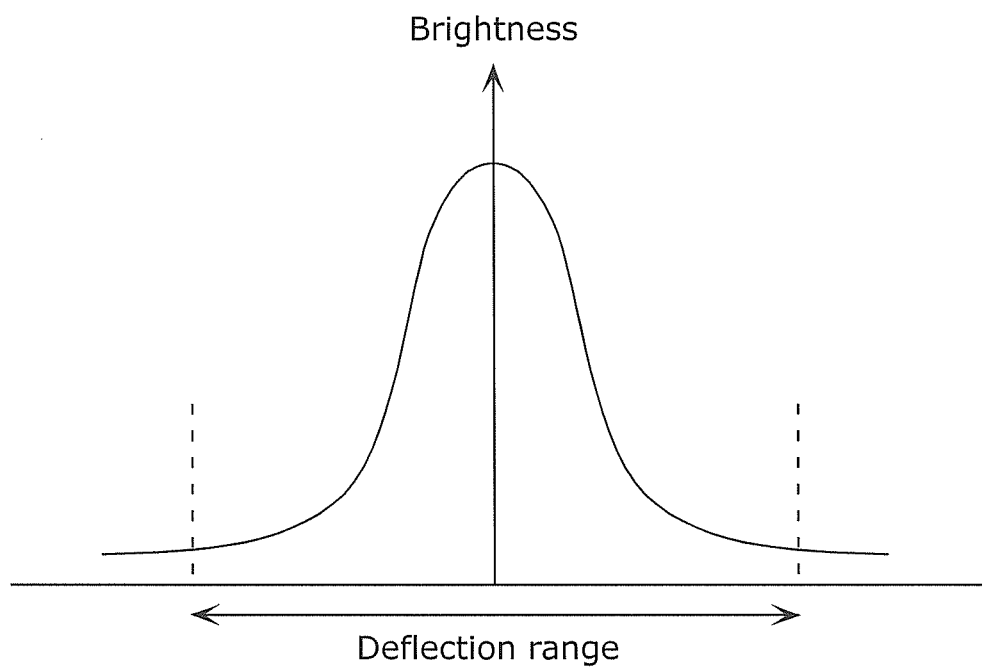
FIG. 10 illustrates brightness distribution of light deflected by a light deflector.

The detection unit 251 detects the deflection range 210 using a method described below. FIG. 10 illustrates brightness distribution of light deflected by the light deflector 102. In FIG. 10, the vertical axis indicates brightness of light deflected by the light deflector 102, and the horizontal axis indicates distance from a deflection center. The deflection center is an optical axis at which light deflected by a light deflector 102 has the highest brightness.

As illustrated in FIG. 10, the detection unit 251 detects, as the deflection range 210, a range where brightness is higher than or equal to a predetermined percentage of the brightness at the deflection center. For example, the detection unit 251 detects, as the deflection range 210, a range within a distance of ±1 cm from the deflection center as a result of detecting a range where brightness is 3% of the brightness at the deflection center or higher. The detection unit 251 thus detects a position where the deflected light has the highest brightness based on image signals from the pair of eye cameras 104a and 104b, and then determine the range within a distance of ±1 cm from the deflection center as the deflection range 210.

The determination unit 252 determines whether or not light deflected by the light deflector 102 appropriately enters the right eye or the left eye of each of the one or more users, based on a positional relationship between the deflection range 210 and the right and left eyes of each of the one or more users. The positional relationship is detected by the detection unit 251. A method of the determination made by the determination unit 252 will be described in detail later.

The display control unit 253 controls operation of the light source 101, the light deflector 102, and the liquid crystal panel 103 based on the result of the determination made by the determination unit 252.

The method of the determination made by the determination unit 252 shall be described below with reference to FIG. 11, FIG. 12A, and FIG. 12B. FIG. 11 illustrates light deflected by the light deflector 102 and appropriately entering a left eye 106b of the user 106. FIG. 12A and FIG. 12B each illustrate light deflected by the light deflector 102 and failing to appropriately enter the left eye 106b of the user 106.

Figure 11:
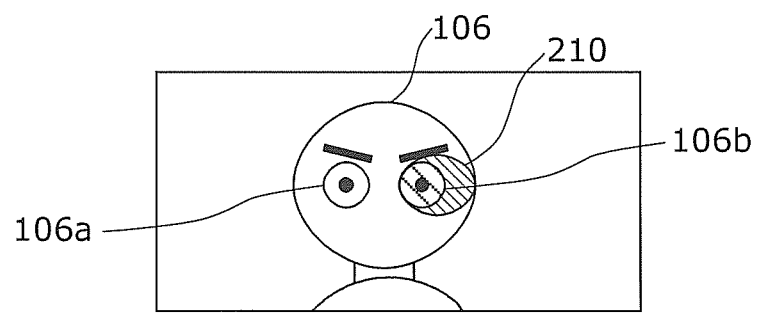
FIG. 11 illustrates light deflected by the light deflector and appropriately entering a left eye of a user.
Figure 12A:
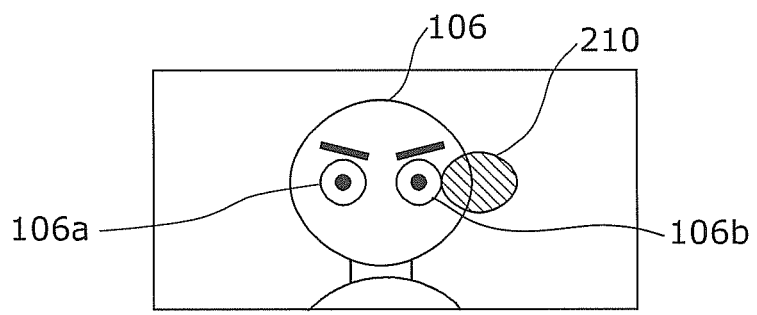
FIG. 12A illustrates light deflected by the light deflector and failing to appropriately enter the left eye of the user.
Figure 12B:
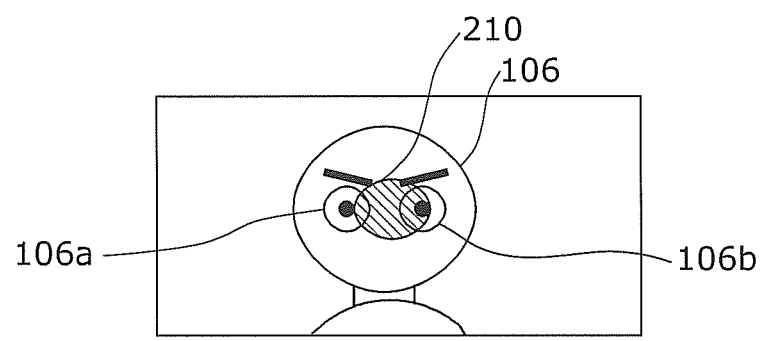
FIG. 12B illustrates light deflected by the light deflector and failing to appropriately enter the left eye of the user.

For example, when the entire left eye 106b of the user 106 is included in the deflection range 210 as illustrated in FIG. 11, the determination unit 252 determines that the light deflected by the light deflector 102 is appropriately entering the left eye 106b of the user 106. In this case, the user 106 appropriately sees an image displayed on the liquid crystal panel 103, and the display control unit 253 thus makes no change to operation of the light deflector 102.

For example, when the entire left eye 106b of the user 106 is outside the deflection range 210 as illustrated in FIG. 12A, the determination unit 252 determines that the light deflected by the light deflector 102 is not appropriately entering the left eye 106b of the user 106. Since the user 106 cannot appropriately see an image displayed on the liquid crystal panel 103, and the display control unit 253 makes a change to operation of the light deflector 102. Specifically, the display control unit 253 adjusts voltage applied to each light deflector element 120 (see FIG. 3A) to move the deflection range 210 toward the left eye 106b of the user 106 (leftward in FIG. 12A). The display control unit 253 ends the adjustment of voltage when the deflection range 210 covers the entire left eye 106b of the user 106. As a result, the user 106 can appropriately see an image displayed on the liquid crystal panel 103.

For example, when a part of the right eye 106a and a part of the left eye 106b of the user 106 are included in the deflection range 210 as illustrated in FIG. 12B, the determination unit 252 determines that the light deflected by the light deflector 102 is not appropriately entering the left eye 106b of the user 106. In this case, what is called crosstalk is occurring in which a left-eye image enters not only the left eye 106b but also the right eye 106a of the user 106. Since the user 106 cannot appropriately see an image (3D image) displayed on the liquid crystal panel 103, and the display control unit 253 makes a change to operation of the light deflector 102. Specifically, the display control unit 253 adjusts voltage applied to each light deflector element 120 (see FIG. 3A) to move the deflection range 210 away from the right eye 106a of the user 106 (rightward in FIG. 12B). The display control unit 253 ends the adjustment of voltage when the deflection range 210 covers the entire left eye 106b of the user 106. As a result, the crosstalk is eliminated so that the user 106 can appropriately see an image displayed on the liquid crystal panel 103.

As described above, the display control unit 253 controls operation of light deflector 102 so that the deflection range 210 and one of the entire right eye 106a and entire left eye 106b of the user 106 overlaps. This allows the user 106 to appropriately see an image displayed on the liquid crystal panel 103.

The detection unit 251 need not use a specific method or algorithm to detect the positions of the right eye 106a and the left eye 106b of the user 106 but may use various methods as appropriate.

A method to detect the deflection range 210 need not be limited to a specific method or algorithm. Various methods may be used as appropriate. For example, the deflection range 210 may be detected by calculating a difference between an image taken immediately before irradiating the left eye 106b of the user 106 with light deflected by the light deflector 102 and an image taken while irradiating the left eye 106b of the user 106 with light deflected by the light deflector 102.

The detection unit 251 may perform the above-described detection at any appropriate time. For example, the detection unit 251 may be configured to perform the detection when the light deflector 102 ends light deflection toward a certain position. In this case, the deflection range 210 is repositioned each time the direction of light deflection is changed, and thereby occurrence of crosstalk is effectively reduced. Optionally, the detection unit 251 may perform the detection only at the beginning of use of the liquid crystal display device 20. This reduces load of processing necessary for adjustment of the deflection range 210.

When the light deflector 102 is dependent on light wavelengths and the light source 101 performs field sequential display by emitting light having different wavelengths in sequence (for example, starting with red light which is followed by blue light then green light), the detection unit 251 may perform the detection each time the wavelength of light emitted from the light source 101 changes. This prevents unwanted change in the position of the deflection range 210 which may occur when the wavelength of light emitted from the light source 101 changes so that deterioration in quality of images displayed on the liquid crystal panel 103.

Embodiment 4

Figure 13:
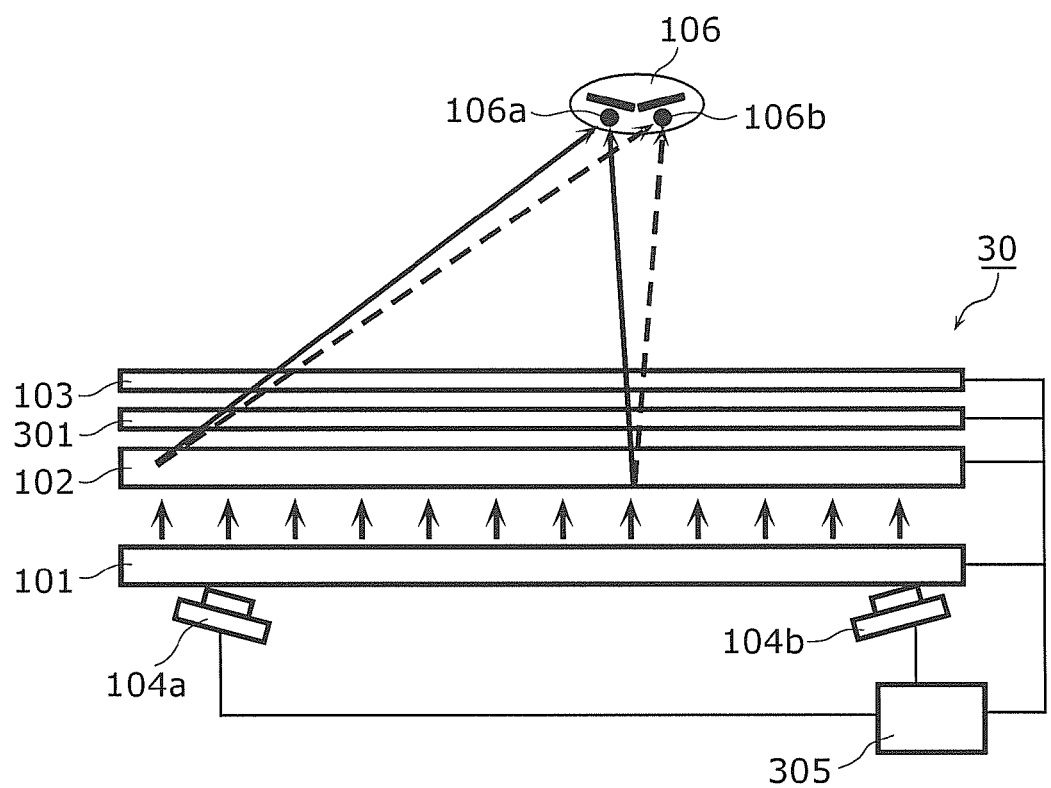
FIG. 13 illustrates a liquid crystal display device according to Embodiment 4.

FIG. 13 illustrates a liquid crystal display device 30 according to Embodiment 4. The liquid crystal display device 30 illustrated in FIG. 13 includes a switchable-diffusion element 301 between a light deflector 102 and a liquid crystal panel 103. The switchable-diffusion element 301 is switchable between a diffusing status in which the switchable-diffusion element 301 is milky white to diffuse light from the light deflector 102 and a non-diffusing status in which the switchable-diffusion element 301 is transparent to transmit light from the light deflector 102. The control unit 305 controls voltage to be applied to the switchable-diffusion element 301. The switchable-diffusion element 301 remains in the diffusing status while the control unit 305 applies no voltage to the switchable-diffusion element 301. Application of voltage by the control unit 305 to the switchable-diffusion element 301 switches the switchable-diffusion element 301 from the diffusing status to the non-diffusing status. The switchable-diffusion element 301 may be implemented using a dynamic hologram having interference stripes which appear and vanish in response to voltage application.

Figure 14:
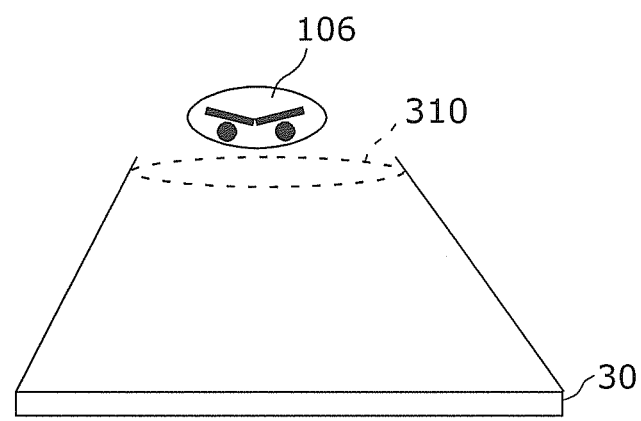
FIG. 14 schematically illustrates a range to which the light deflector can deflect light.

A method of controlling the switchable-diffusion element 301 by the control unit 305 shall be described below with reference to FIG. 14 to FIG. 16. FIG. 14 schematically illustrates a range 310 to which the light deflector 102 can deflect light (hereinafter referred to as a deflectable range). In Embodiment 4, the control unit 305, based on image signals from a pair of eye cameras 104a and 104b, detects the position of the deflectable range 310 and positions of the right eye 106a and left eye 106b of the user 106 viewing an image on the liquid crystal panel 103. Next, the control unit 305 switches the switchable-diffusion element 301 between the diffusing status and the non-diffusing status based on a positional relationship between the deflectable range 310 and the positions of the right eye 106a and left eye 106b of the user 106.

Figure 15:
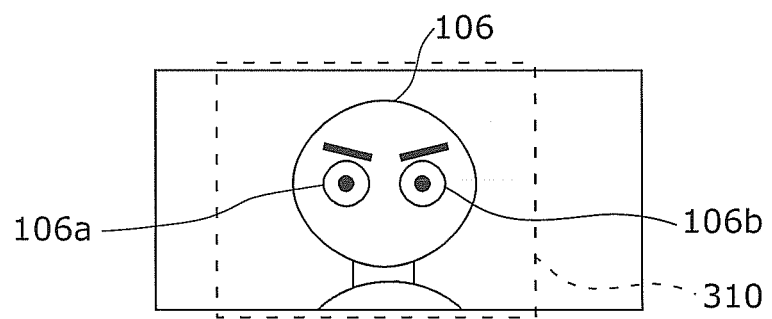
FIG. 15 illustrates a situation in which the right and left eyes of a user are within a deflectable range.

FIG. 15 illustrates a situation in which the right eye 106a and left eye 106b of the user 106 are within the deflectable range 310. When the right eye 106a and left eye 106b of the user 106 are within the deflectable range 310 as shown in FIG. 15, the control unit 305 switches the switchable-diffusion element 301 to the non-diffusing status and images to be displayed on the liquid crystal panel 103 to 3D images. Light deflected by the light deflector 102 passes through the switchable-diffusion element 301 without being diffused by the switchable-diffusion element 301, and then enters the liquid crystal panel 103. Light from the liquid crystal panel 103 is thereby directed toward the right eye 106a and the left eye 106b of the user 106 alternately through time. The liquid crystal display device 30 thereby functions as a glasses-free 3D display (or as a privacy display).

Figure 16:
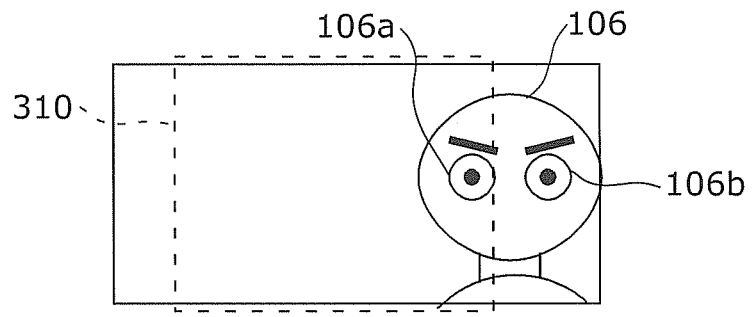
FIG. 16 illustrates a situation in which the right and left eyes of the user are outside the deflectable range.

FIG. 16 illustrates a situation in which the left eye 106b of the user 106 is outside the deflectable range 310. When at least one of the right eye 106a and left eye 106b of the user 106 is outside the deflectable range 310 as shown in FIG. 16, the control unit 305 switches the switchable-diffusion element 301 from the non-diffusing status to the diffusing status and images to be displayed on the liquid crystal panel 103 to 2D images. Light deflected by the light deflector 102 is diffused by the switchable-diffusion element 301, and then enters the liquid crystal panel 103. In this situation, light from the liquid crystal panel 103 is diffused inside and outside the deflectable range 310 so that the light from the liquid crystal panel 103 can enter the right eye 106a and left eye 106b of the user 106. The liquid crystal display device 30 thereby functions as a 2D display device to display normal 2D images.

As described above, the liquid crystal display device 30 according to Embodiment 4 achieves a wide viewing angle. Embodiment 4 is applicable not only to the above-described case where one user 106 is viewing images displayed on the liquid crystal panel 103 but also to the case where a plurality of users are viewing images displayed on the liquid crystal panel 103. Specifically, when at least one of the right and left eyes of any of the users is outside the deflectable range 310, the control unit 305 switches the switchable-diffusion element 301 from the non-diffusing status to the diffusing status and switches images to be displayed on the liquid crystal panel 103 from 3D images to 2D images.

The control unit 305 in Embodiment 4 may control operation of the switchable-diffusion element 301 using a method other than the above-described method in which the control unit 305 controls operation of the switchable-diffusion element 301 based on image signals from the pair of the eye cameras 104a and 104b. For example, when the liquid crystal display device 30 is a portable display such as a tablet device, the control unit 305 controls operation of the switchable-diffusion element 301 based on a detection signal from sensors for orientation detection such as a gyroscope or a rear-face sensor of the display device. Specifically, the control unit 305 switches the switchable-diffusion element 301 to the diffusing status when the sensor detects an orientation in which the display device is laid down on a desk or the like. The control unit 305 switches the switchable-diffusion element 301 to the non-diffusing status when the sensor detects an orientation in which the display is raised from a flat position on a desk or the like. This allows a plurality of users to see images displayed on the liquid crystal panel 103 of the display device laid on a desk or the like together.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the display device according to each of the embodiments is a program described below.

The program causes a computer to execute a method for controlling a display device including: a light source which emits light; a light deflector having a deflection region in which light from the light source is deflected toward a predetermined position; and a display panel on which an image is formed by the light from the light deflector, and the method includes: determining a total number of right and left eyes of one or more users viewing the image displayed on the display panel; segmenting the deflection region into a plurality of deflection subregions based on the determined total number of right and left eyes; and controlling light deflection in the deflection subregions so that the light from the light source is deflected toward different positions at the same time.

The herein disclosed subject matter is to be considered descriptive and illustrative only, and the appended Claims are of a scope intended to cover and encompass not only the particular embodiments disclosed, but also equivalent structures, methods, and/or uses.

The display device according to one or more exemplary embodiments disclosed herein is applicable to liquid crystal display devices, such as a glasses-free 3D display, a privacy display, and a power-saving display. The power-saving display refers to a display which can limit the viewable range of images (that is, viewing angle) to lower the amount of light emitted from its backlight.

The invention claimed is:
1. A display device which displays an image, comprising:
a light source which emits light;
a light deflector having a deflection region in which the light from the light source is deflected toward a predetermined position;
a display panel on which the image is formed by the light from the light deflector;
a camera which captures an image of a front area of the display device; and a controller that determines, based on the image captured by the camera, a total number of right and left eyes of one or more users viewing the image displayed on the display panel, and controls operation of the light deflector based on the determined total number of right and left eyes so that the light deflected by the light deflector is directed alternately toward a right eye and a left eye of each of the one or more users, wherein the controller segments the deflection region into deflection subregions based on the determined total number of right and left eyes, and controls light deflection in the deflection subregions so that the light from the light source is deflected toward different positions at a same time, the controller sets a total number M of the deflection subregions that satisfies a relational expression $(N \times \Delta T)/M \leq Frame\_T$, where $\Delta T$ is a unit deflection time to be taken for the light deflector to deflect light from the light source toward any eye of the one or more users, Frame_T is a display time during which a frame of the image is displayed on the display panel, and N is the determined total number of right and left eyes, and the controller controls the light deflection in the deflection subregions so that the light is deflected toward the right and left eyes of the one or more users within the display time Frame_T.

2. The display device according to claim 1, wherein each of the deflection subregions is discontinuous and the deflection subregions are interlaced.

3. The display device according to claim 1, wherein the deflection region has light deflector elements each of which is a smallest unit for controlling a direction of light deflection, the light deflector elements are arranged in a predetermined direction, the display panel includes pixels arranged in the predetermined direction, and each of the light deflector elements has a size in the predetermined direction smaller than a size of each of the pixels in the predetermined direction.

4. The display device according to claim 1, wherein the controller identifies a specific user from the users, and controls the light deflection in the deflection subregions so that the light is deflected more frequently toward the right and left eyes of the specific user than toward the right and left eyes of any other user among the users.

5. The display device according to claim 1, wherein the controller segments the deflection region into a first deflection subregion and a second deflection subregion, and controls the light deflection in the first deflection subregion so that the light from the light source is deflected toward the right eye of each of the one or more users, and controls the light deflection in the second deflection subregion so that the light from the light source is deflected toward the left eye of each of the one or more users.

6. The display device according to claim 1, wherein when the determined total number of right and left eyes is less than or equal to a predetermined number, the controller avoids segmenting the deflection region into the deflection subregions.

7. A method for controlling a display device including:
a light source which emits light;
a light deflector having a deflection region in which light from the light source is deflected toward a predetermined position; and
a display panel on which an image is formed by the light from the light deflector, the method comprising:
capturing an image of a front area of the display device using a camera;
determining, based on the image captured using the camera, a total number of right and left eyes of one or more users viewing the image displayed on the display panel;
segmenting the deflection region into deflection subregions based on the determined total number of right and left eyes; and
controlling light deflection in the deflection subregions so that the light from the light source is deflected toward different positions at a same time,
wherein the controlling light deflection in the deflection subregions sets a total number M of the deflection subregions that satisfies a relational expression $(N \times \Delta T)/M \leq Frame\_T$, where $\Delta T$ is a unit deflection time to be taken for the light deflector to deflect light from the light source toward any eye of the one or more users, Frame_T is a display time during which a frame of the image is displayed on the display panel, and N is the determined total number of right and left eyes, and
the controlling light deflection in the deflection subregions controls the light deflection in the deflection subregions so that the light is deflected toward the right and left eyes of the one or more users within the display time Frame_T.

* * * * *